Oct. 4, 1955  B. C. EISENBERG  2,719,661
MACHINES FOR BOTTLING OLIVES
Filed Jan. 17, 1955  4 Sheets-Sheet 1
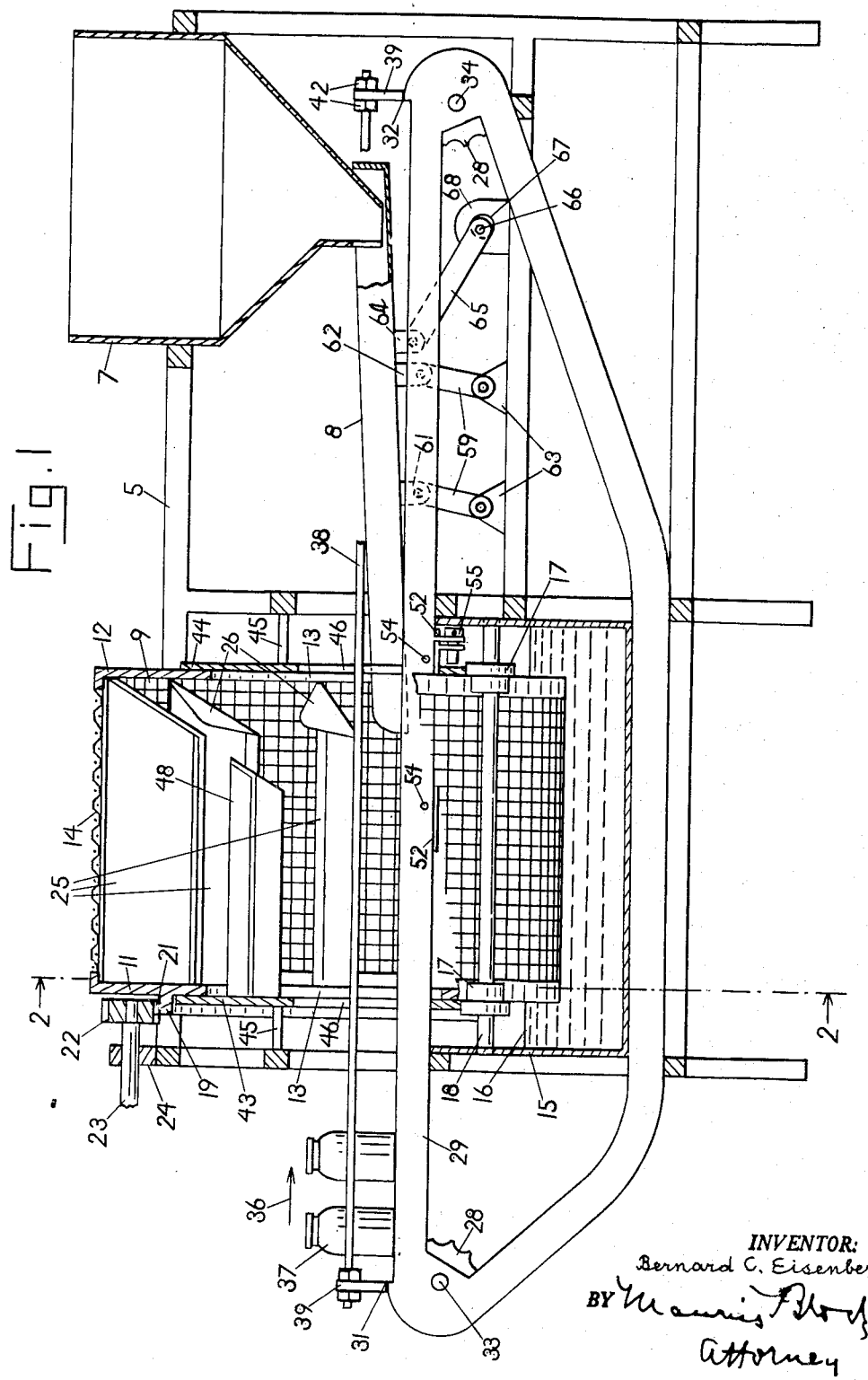
INVENTOR:
Bernard C. Eisenberg
BY  Maurice Block
Attorney Oct. 4, 1955  B. C. EISENBERG  2,719,661
MACHINES FOR BOTTLING OLIVES
Filed Jan. 17, 1955  4 Sheets-Sheet 2
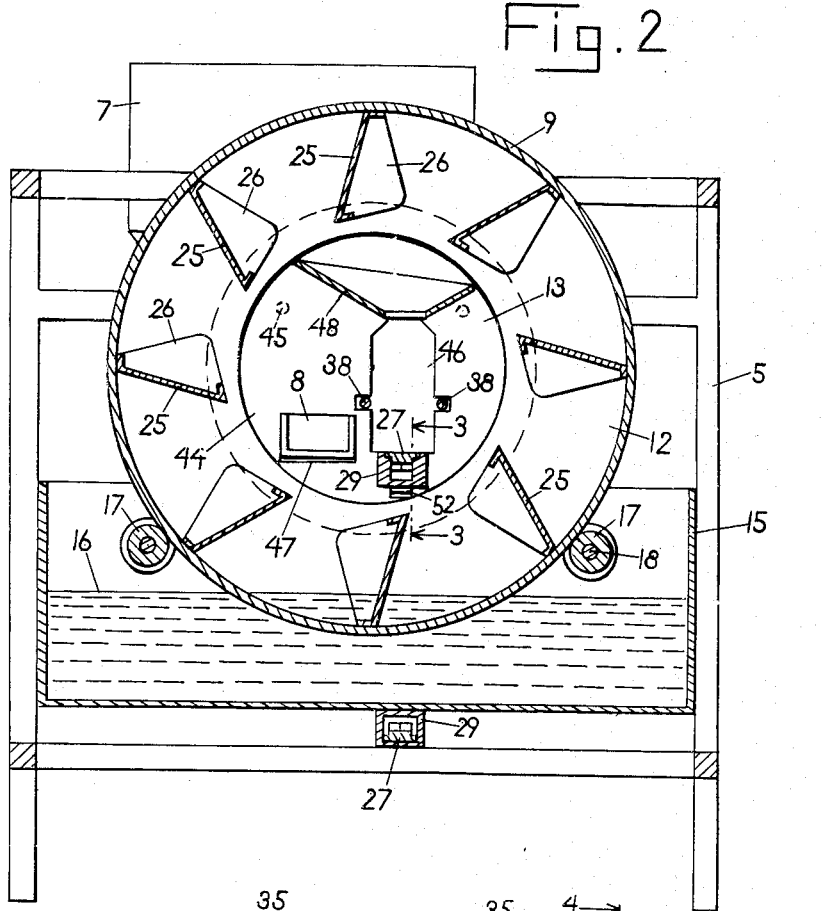
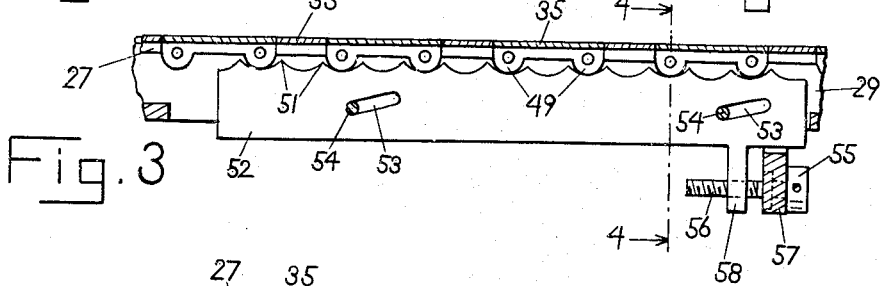
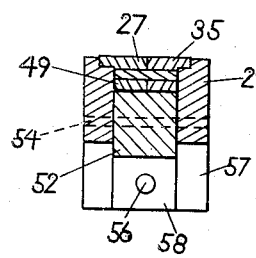
INVENTOR:
Bernard C. Eisenberg
BY Maurice Block
Attorney INVENTOR.
Bernard C. Eisenberg Oct. 4, 1955  B. C. EISENBERG  2,719,661
MACHINES FOR BOTTLING OLIVES
Filed Jan. 17, 1955  4 Sheets-Sheet 4
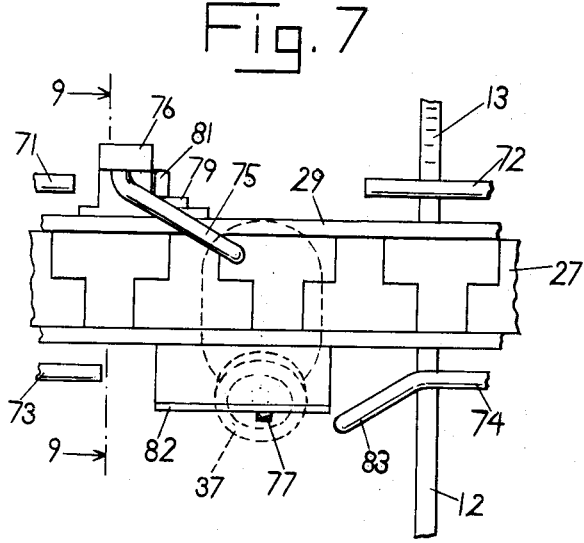
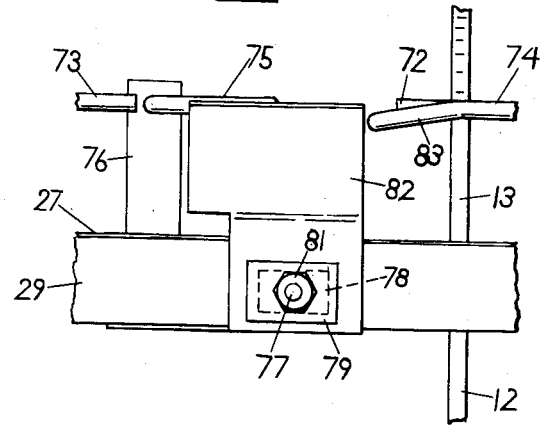
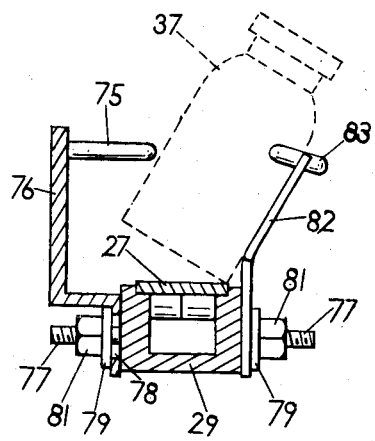
INVENTOR.
Bernard C. Eisenberg
BY

United States Patent Office 2,719,661
Patented Oct. 4, 1955

2,719,661

MACHINES FOR BOTTLING OLIVES

Bernard C. Eisenberg, Brooklyn, N. Y.

Application January 17, 1955, Serial No. 482,331

14 Claims. (Cl. 226—72)

My invention relates to machines for bottling fruits, especially such delicate fruits as olives.

Objects of my invention are to fill a series of bottles or jars, one after the other, automatically and quickly with fruits, to avoid contact of hands with the fruits during the filling operation, and thereby to expedite this operation and to make the same more sanitary, less expensive and more uniform.

Other objects are to move the bottles during and after the filling continuously and with uniform speed, to drop the fruits into the bottles in a manner that avoids damaging the fruits, to cushion the drop of fruits which may drop aside of the bottles, and to lift the latter fruits again for renewed drop.

Further objects are to shake the bottles automatically in order to make the fruits settle densely in the bottles, and to derive the shaking movement from the means carrying the bottles along their path.

Still other objects are to enable one person to supervise simultaneously the supply of fruits and the filled bottles so that the same person may discard unfit fruits from the supply, may remove too high piled fruits from the filled bottles or may position unsufficiently filled bottles for repeated filling, and for this purpose, to arrange the path of the fruit supply near and aside to the path of the filled bottles.

Still further objects are to attain these results with simple and reliable means, and to provide a fruit bottling machine that can be easily made, driven by motors of any type, conveniently operated and efficiently supervised.

Still other objects and advantages will appear from the following description of an exemplifying embodiment of my invention, from the appended claims and from the accompanying drawing in which:

Fig. 1 shows a partly sectional side view of an illustrative embodiment of my invention.

Fig. 2 shows a cross-section taken along the line 2—2 in Fig. 1.

Fig. 3 shows a cross-section of a detail, this cross-section being taken along the line 3—3 in Fig. 2.

Fig. 4 shows a cross-section taken along the line 4—4 in Fig. 3.

Fig. 7 shows a top view of a modification of a portion of the same embodiment.

Fig. 8 shows a side view of the same modification, seen from the lower side in Fig. 7.

Fig. 9 shows a cross-section taken along the line 9—9 in Fig. 7.

Figs. 3, 4 and 6 to 9 are represented on a larger scale than Figs. 1, 2 and 5.

Figure 5:
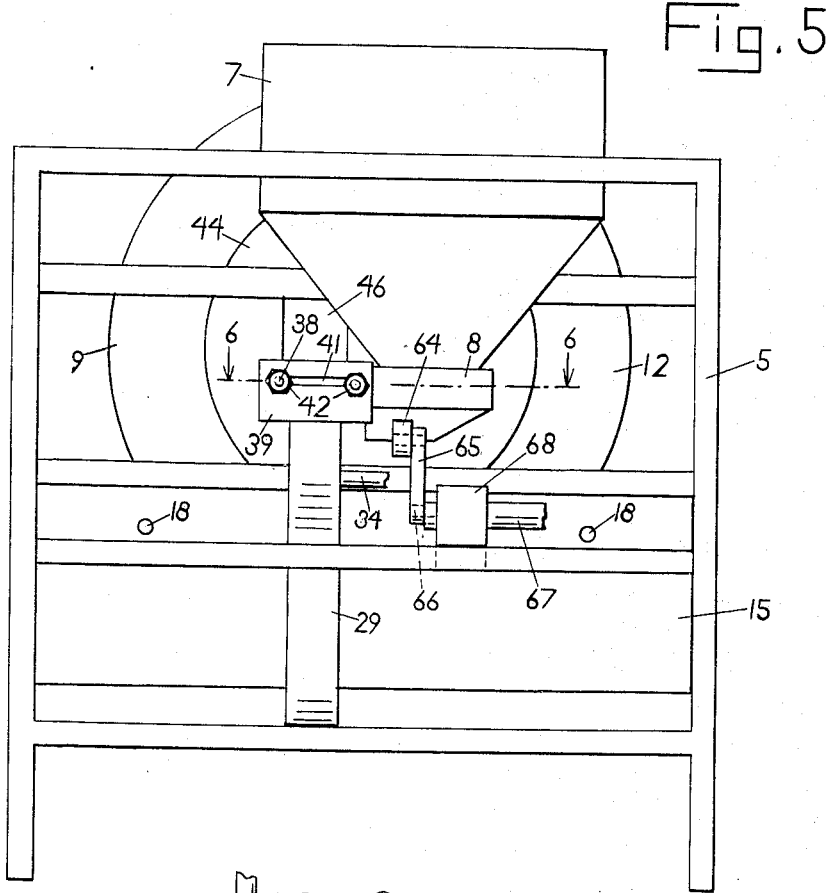
Fig. 5 shows a view seen from the right side in Fig. 1.
Figure 6:
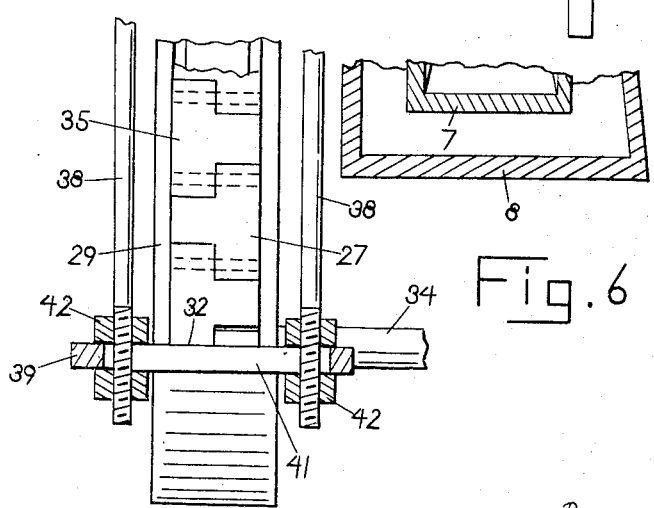
Fig. 6 shows a cross-section of parts of the same embodiment, this cross-section being taken along the line 6—6 in Fig. 5.

Referring to the drawings, numeral 5 indicates a framework which may consist of vertical posts or legs and horizontal beams arranged suitably for supporting the other parts of the machine. A hopper 7 is affixed to this framework and is adapted to receive the contents of a fruit barrel from which the fruits may be poured into this hopper without contacting hands. The lower end of the hopper 7 has an opening through which the fruits reach a chute 8. This chute extends in substantially horizontal, slightly declining direction from the receiving end under the hopper 7 to an outlet end positioned within a drum 9.

This drum has a horizontally extending axis and a preferably cylindrical shape. Its end side walls are formed by plates 11 and 12 which have central apertures 13 of relatively large diameters whereby these plates have annular shape and reach from the drum's periphery toward its axis considerably less far as to this axis. Preferably, the peripheral wall 14 of the drum is made of strong wires forming a mesh.

A trough or basin 15 may surround the lowermost portion of the drum 9 and is adapted to be filled with water, for example, up to a level 16. The water enters the drum through the mesh 14. The trough 15 is stationarily supported, for example, affixed to the framework 5.

The drum 9 is rotatably supported by means which are spaced from its axis whereby these means do not reach into the horizontal path defined by the apertures 13. For example, the drum rests on four rollers 17 which are in supporting contact with the annular walls 11 and 12. These rollers may be arranged in pairs, each pair being affixed to a shaft 18 which is rotatable in bores or bearings of the trough 15. The drum 9 may be rotated by any suitable and known driving means. For example, the side wall 11 may have a circular projection or flange 19 provided with teeth 21 and forming a toothed wheel connected with the drum. This wheel engages a smaller toothed wheel 22 which is affixed to a shaft 23. This shaft is rotatably supported by a bearing 34 affixed to the framework 5 and may be driven by a motor in known, not shown manner.

A plurality of lifting blades or shovel plates 25 is positioned in and affixed to the drum 9, preferably to the side walls 11 and 12. These blades are distributed about the drum's axis and extend between its annular side walls, that is not farther toward this axis than these side walls. Preferably, each blade 25 has a main portion extending parallel to this axis and inclined relatively to the radial direction and has a smaller corner portion 26 bent into a plane inclined toward the axis away from the side wall 12.

A conveyor 27 extends along a substantially horizontal path through the apertures 13. Preferably, this conveyor is a chain which is endless and runs over sprocket wheels 28. This chain may be guided in a guide 29 which has an open top along the horizontal stretch from the point 31 near the left end of Fig. 1 to the point 32 near the right end of this figure. The remaining part of the guide may form a closed channel, except that this channel may have openings for the sprocket wheels 28 and their shafts 33 and 34. The guide is affixed to the framework 5. The links of the chain 27 are provided with plate-like portions 35 which, along the upper horizontal path between the points 31 and 32, form a substantially closed platform flush with or slightly higher than the top of the guide 29. The distance between the points 31 and 32 is preferably larger than shown in Fig. 1 where the distance is reduced for the sake of representation within the limits of a sheet of drawing.

The conveyor 27 is driven continuously in the direction of the arrow 36 in Fig. 1 by any suitable and known means, for example by a not shown motor driving the shaft 34 of one of the sprocket wheels. Bottles 37 are placed on the conveyor near the point 31, ride on the same through the drum 9 and are taken off the conveyor before they reach the point 32. The bottles may be guided additionally by rails 38 extending parallel to the path of the conveyor at both sides of the bottles. These rails are stationary and may be affixed, for example, to plates 39 which, in turn, are affixed to the guide 29 at the points 31 and 32. The distance between the rails 38 is preferably slightly larger than the thickness of a bottle 37 and may be adjustable for bottles of different sizes. For this purpose, the plates 39 may have horizontal slots 41, and the ends of the rails are threaded, pass through these slots and are engaged by nuts 42 which are tightly pressed against the plates 39 after the position of the rails has been adjusted. In Fig. 1, a portion of the rails 38 is broken off for the sake of clearer representation of the chute positioned behind the rails.

Two circular plates 43 and 44 are stationarily positioned and form covers or closures for annular portions of the apertures 13 of the drum 9. Preferably, these plates are adjacent to the outer sides of the drum walls 11 and 12, are co-axial with the same and have diameters larger than those of the apertures 13. The plates 43 and 44 may be affixed to the framework 5, for example, by bolts 45. Each of the plates 43 and 44 has an opening 46 for the passage of the bottles, of the conveyor, of its guide 29 and of the rails 38. The plate 44 has an additional opening 47 for the passage of the chute 8.

A funnel 48 is stationarily positioned in the drum 9 and may be affixed to the plate 43. This funnel has an elongated shape and an elongated outlet extending horizontally parallel to and over the conveyor 27 or the path of the botles 37. The distance of this funnel from the conveyor is a little larger than the height of the largest bottle to be used in the machine. The funnel 48 does not reach into the path of the blades 25, and the rim of its top opening is slightly nearer to the drum axis than the inner portions of the blades. Preferably, the funnel extends only along a portion of the distance between the drum end walls.

Means are provided for vibrating the conveyor and, thereby, for shaking the bottles after the latter have passed under the initial stretch of the funnel's outlet. This vibration is preferably derived from the longitudinal movement of the conveyor in the following manner: The conveyor 27 has downward projections arranged at regular intervals and preferably formed by the eyelets 49 connecting the links of the conveyor. (See Figs. 3 and 4.) During the movement of the conveyor, these projections meet upward projections or teeth 51 of a rail or ledge 52 which is inserted in a slot of the bottom of the guide 29. The projections 51 are passed by the conveyor links while the latter are slightly raised whereupon the projections 49 drop again into the spaces between the teeth 51.

The rail 52 is secured to the guide 29, preferably adjustably so that the height or intensity of the vibration can be adjusted as required. For this purpose, the rail 52 has two obliquely rising slots 53 through which pins 54 affixed to the guide 29 pass. The drawing shows the rail 52 set for largest height and strongest vibration. The height of the teeth 51 and of the vibratory chain movement can be reduced by shifting the rail 52 to the left side in Fig. 3. This adjustment is carried out by turning the perforated head 55 of a bolt 56 which is rotatable, but not shiftable in a plate 57 affixed to the guide 29. The bolt 56 has an elongated threaded portion which passes through a correspondingly threaded nut-like plate 58 forming a projection of the rail 52.

The movement of the fruits along the chute 8 is preferably expedited and regulated by vibrations of this chute. For this purpose, the chute may be supported by feet 59 which have upper ends rotatably connected with lugs 61 and 62 affixed to the lower side of the chute and have lower ends rotatably connected with bearings 63 affixed to the framework 5. Another similarly affixed lug 64 is rotatably connected to one end of a rod 65 which has another end forming a bearing for a pin 66. This pin is eccentrically affixed to a shaft 67 which is rotatable in a bearing 68 affixed to the framework 5 and may be driven by a not shown motor in known manner.

The speed with which the fruits travel along the chute 8 is regulated by the speed of the shaft 67 which, by means of the eccenter 66, oscillates the chute. The fruits which reach the outlet end of the chute drop into the drum 9. This drop is cushioned by the water filling the bottom of the drum. Each of the rotating blades 25 lifts some of these fruits over the funnel 48 and lets them fall into this funnel. From the funnel, the fruits drop into those bottles 37 which, at that time, pass under the funnel. If some fruits happen to fall aside of the funnel or aside of the bottles, these fruits drop again to the bottom of the drum and are lifted again by the blades 25.

While the bottles pass under the initial portion of the funnel's outlet which is the portion adjacent to the plate 43, they are filled up to their tops, but the filling may be loose. During the following travel of the bottles, the same are shaken in the manner described before whereby the fruits settle densely in the bottles. If the densely settled fruits do not fill the bottles up to the top, the remaining space in the bottles is filled by more fruits dropping from the last portion of the funnel's outlet. The fruits may form a pile exceeding the height of the respective bottle. This pile is shaken down during further movement of the bottles over the rail 52. If still a fruit should project beyond the bottle top, this fruit may be removed from the bottle and transferred to the chute adjacent to the conveyor. The same person who performs this operation can easily also inspect the fruits moving in the chute and remove therefrom those fruits which appear bad or unfit for being bottled.

The manual removal of fruits piled too high on top of the bottles may be avoided by providing the machine with means tilting the bottles temporarily. Such a modification of the machine may include the details shown in Figs. 7 to 9. The rails 38 are replaced in this modification by similar rails interrupted by a gap so that one rail has an initial portion 71 spaced from a terminal portion 72, and the other rail has an initial portion 73 spaced from a terminal portion 74. A finger-like guide member 75 extends from one side of the path of the bottles, for example from the side of the rail 71—72, obliquely toward the other side and reaches into the path of the erect proceeding bottles. The finger 75 is affixed to a bracket 76 which is held stationarily and is preferably adjustably connected to the guide 29. For example, a bolt 77 is affixed to the guide 29, passes with large clearance through an opening 78 of the bracket 76 and through a narrower hole of a cover plate or washer 79, and has threads engaging a nut 81.

A guide plate 82 is positioned at the other side of the path of the bottles and extends along this other side in the gap between the rail portions 73 and 74. This guide plate is adjustably connected to the conveyor guide 29, for example, in a manner similar to the connection of the bracket 76 by means of another bolt 77, another washer plate 79 and another nut 81, the lower portion of the guide plate 82 having an opening identical to the opening 78 of the bracket. The upper portion of the guide plate 82 rises obliquely away from the conveyor 27 or from the path of the bottles.

Another finger 83 has an end positioned at the same side of the bottle path as the guide plate 82 and near that side of this guide plate which is this plate's end in the moving direction of the conveyor. Therefrom the finger 83 extends obliquely toward the end of the rail portion 74 which defines the end of the rail gap. The other end of the finger 83 may be united with this end of the rail portion 74 whereby this finger forms a bent extension of this rail portion.

The details shown in Figs. 7 to 9 may be arranged at any suitable portion of the path of the bottles which is farther in the moving direction than the funnel 48 (Fig. 1). Preferably, these details are incorporated in the machine within the drum near to the opening 13 of its side wall 12.

When a bottle 37 riding on the conveyor 27 in erect position meets the finger 75, this finger urges the farther moving bottle aside toward the guide plate 82 until one side of the bottle comes to rest on this plate in the tilted position shown in dotted lines in Figs. 7 and 9. The progressive movement of the following bottles drives the tilted bottle farther and into contact with the finger 83 whereupon the latter finger guides the bottle back into an erect position between the rail portions 72 and 74.

While the bottle is tilted in the manner described, excessive fruits which may be piled on its top drop therefrom and fall into the drum if the tilting occurs within the drum. If the tilting device is arranged outside of the drum, the guide plate 82 may be arranged at that side of the conveyor which is near to the chute 8 so that these fruits will fall into this chute.

I desire it understood that my invention is not confined to the particular embodiment shown and described, the same being merely illustrative, and that my invention may be carried out in other ways within the scope of the appended claims without departing from the spirit of my invention as it is obvious that the particular embodiment shown and described is only one of the many that may be employed to attain the objects of my invention.

Having described the nature of my invention, what I claim and desire to protect by Letters Patent is:

1. A machine for filling bottles with fruits, comprising a drum having a horizontally extending axis, means supporting said drum rotatably and being spaced from said axis, said drum having a peripheral wall and two annular side end walls reaching from said drum's periphery toward said axis considerably less far than to said axis whereby said drum has large lateral apertures surrounding said axis; lifting blades affixed to said drum and extending between said annular walls; a conveyor for said bottles extending and movable along a horizontal path through said apertures; and a fruit supply chute extending through one of said apertures.

2. A machine for filling bottles with fruits, comprising a drum having a horizontally extending axis, means supporting said drum rotatably and being spaced from said axis, said drum having a peripheral wall forming a mesh, and two annular side end walls reaching from said drum's periphery toward said axis considerably less far than to said axis whereby said drum has large lateral apertures surrounding said axis; lifting blades affixed to said drum and extending between said annular walls; a conveyor for said bottles extending and movable along a horizontal path through said apertures; and a fruit supply chute extending through one of said apertures.

3. A machine for filling bottles with fruits, comprising a drum having a horizontally extending axis, means supporting said drum rotatably and being spaced from said axis, said drum having a peripheral wall forming a mesh, and two annular side end walls reaching from said drum's periphery toward said axis considerably less far than to said axis whereby said drum has large lateral apertures surrounding said axis; a water trough surrounding the lowermost portion of said drum; lifting blades affixed to said drum and extending between said annular walls; a conveyor for said bottles extending and movable along a horizontal path through said apertures; and a fruit supply chute extending through one of said apertures.

4. A machine for filling bottles with fruits, comprising a drum having a horizontally extending axis, means supporting said drum rotatably and being spaced from said axis, said drum having a peripheral wall and two annular side end walls reaching from said drum's periphery toward said axis considerably less far than to said axis whereby said drum has large lateral apertures surrounding said axis; lifting blades affixed to said drum and extending between said annular walls; a conveyor for said bottles extending and movable along a horizontal path through said apertures; a funnel positioned in said drum nearer to said axis than said blades and having an outlet over and more spaced from said conveyor than the height of one of said bottles; means supporting said funnel stationarily; and a fruit supply chute extending through one of said apertures.

5. A machine for filling bottles with fruits, comprising a drum having a horizontally extending axis, means supporting said drum rotatably and being spaced from said axis, said drum having a peripheral wall and two annular side end walls reaching from said drum's periphery toward said axis considerably less far than to said axis whereby said drum has large lateral apertures surrounding said axis; lifting blades affixed to said drum and extending between said annular walls; a conveyor for said bottles extending and movable along a horizontal path through said apertures; a funnel positioned in said drum nearer to said axis than said blades and having an elongated outlet parallel to, over and more spaced from said conveyor than the height of one of said bottles; means supporting said funnel stationarily; and a fruit supply chute extending through one of said apertures.

6. A machine for filling bottles with fruits, comprising a drum having a horizontally extending axis, means supporting said drum rotatably and being spaced from said axis, said drum having a peripheral wall and two annular side end walls reaching from said drum's periphery toward said axis considerably less far than to said axis whereby said drum has large lateral apertures surrounding said axis; lifting blades affixed to said drum and extending between said annular walls; a conveyor for said bottles extending and movable along a horizontal path through said apertures; a fruit supply chute extending through one of said apertures; two plates, each forming a cover for one of said apertures and having an opening for the passage of said conveyor and bottles, one of said plates having an additional opening for the passage of said chute; and means supporting said plates stationarily.

7. A machine for filling bottles with fruits, comprising a drum having a horizontally extending axis, means supporting said drum rotatably and being spaced from said axis, said drum having a peripheral wall and two annular side end walls reaching from said drum's periphery toward said axis considerably less far than to said axis whereby said drum has large lateral apertures surrounding said axis; lifting blades affixed to said drum and extending between said annular walls; a conveyor for said bottles extending and movable along a horizontal path through said apertures; a fruit supply chute extending through one of said apertures; two plates, each forming a cover for one of said apertures and having an opening for the passage of said conveyor and bottles, one of said plates having an additional opening for the passage of said chute; means supporting said plates stationarily; and a funnel affixed to one of said plates, positioned in said drum nearer to said axis than said blades and having an outlet over and more spaced from said conveyor than the height of one of said bottles.

8. A machine for filling bottles with fruits, comprising a drum having a horizontally extending axis, means supporting said drum rotatably and being spaced from said axis, said drum having a peripheral wall and two annular side end walls reaching from said drum's periphery toward said axis considerably less far than to said axis whereby said drum has large lateral apertures surrounding said axis; lifting blades affixed to said drum and extending between said annular walls; a conveyor for said bottles extending and movable along a horizontal path through said apertures; a fruit supply chute having an outlet end in said drum and extending from said end in a slightly rising direction toward the side to which said conveyor moves, through one of said apertures and farther near and almost parallel to said conveyor; and means vibrating said chute.

9. A machine for filling bottles with fruits, comprising a drum having a horizontally extending axis, means supporting said drum rotatably and being spaced from said axis, said drum having a peripheral wall and two annular side end walls reaching from said drum's periphery toward said axis considerably less far than to said axis whereby said drum has large lateral apertures surrounding said axis; lifting blades affixed to said drum and extending between said annular walls; a conveyor for said bottles extending and movable along a horizontal path through said apertures; a funnel positioned in said drum nearer to said axis than said blades and having an elongated outlet parallel to, over and more spaced from said conveyor than the height of one of said bottles; means supporting said funnel stationarily; a fruit supply chute extending through one of said apertures and means vibrating said conveyor along a portion of said path which is farther in the moving direction than the initial portion of said funnel outlet.

10. A machine for filling bottles with fruits, comprising a drum having a horizontally extending axis, means supporting said drum rotatably and being spaced from said axis, said drum having a peripheral wall and two annular side end walls reaching from said drum's periphery toward said axis considerably less far than to said axis whereby said drum has large lateral apertures surrounding said axis; lifting blades affixed to said drum and extending between said annular walls; a conveyor for said bottles extending and movable along a horizontal path through said apertures; a funnel positioned in said drum nearer to said axis than said blades and having an elongated outlet parallel to, over and more spaced from said conveyor than the height of one of said bottles; means supporting said funnel stationarily; a fruit supply chute extending through one of said apertures and means vibrating said conveyor along a portion of said path which is farther in the moving direction than the initial portion of said funnel outlet, said latter means comprising downward projections forming parts of said conveyor, and a rail stationarily secured under said conveyor and having upward projections reaching into the path of said downward projections.

11. A machine for filling bottles with fruits, comprising a drum having a horizontally extending axis, means supporting said drum rotatably and being spaced from said axis, said drum having a peripheral wall and two annular side end walls reaching from said drum's periphery toward said axis considerably less far than to said axis whereby said drum has large lateral apertures surrounding said axis; lifting blades affixed to said drum and extending between said annular walls; a conveyor for said bottles extending and movable along a horizontal path through said apertures; a funnel positioned in said drum nearer to said axis than said blades and having an elongated outlet parallel to, over and more spaced from said conveyor than the height of one of said bottles; means supporting said funnel stationarily; a fruit supply chute extending through one of said apertures and means vibrating said conveyor along a portion of said path which is farther in the moving direction than the initial portion of said funnel outlet, said latter means comprising downward projections forming parts of said conveyor, a rail stationarily secured under said conveyor and having upward projections reaching into the path of said downward projections, and means for adjusting the height of said rail.

12. A machine for filling bottles with fruits, comprising a drum having a horizontally extending axis, means supporting said drum rotatably and being spaced from said axis, said drum having a peripheral wall and two annular side end walls reaching from said drum's periphery toward said axis considerably less far than to said axis whereby said drum has large lateral apertures surrounding said axis; lifting blades affixed to said drum and extending between said annular walls; a conveyor for said bottles extending and movable along a horizontal path through said apertures; stationary rails positioned aside of said path and being adjusted for guiding said bottles in erect position; and a fruit supply chute extending through one of said apertures.

13. A machine for filling bottles with fruits, comprising a drum having a horizontally extending axis, means supporting said drum rotatably and being spaced from said axis, said drum having a peripheral wall and two annular side end walls reaching from said drum's periphery toward said axis considerably less far than to said axis whereby said drum has large lateral apertures surrounding said axis; lifting blades affixed to said drum and extending between said annular walls; a conveyor for said bottles extending and movable along a horizontal path through said apertures; stationary rails positioned aside of said path and being adjusted for guiding said bottles in erect position, said rails being interrupted by a gap; means guiding said bottles to and from a tilted position while said bottles pass said gap; and a fruit supply chute extending through one of said apertures.

14. A machine for filling bottles with fruits, comprising a drum having a horizontally extending axis, means supporting said drum rotatably and being spaced from said axis, said drum having a peripheral wall and two annular side end walls reaching from said drum's periphery toward said axis considerably less far than to said axis whereby said drum has large lateral apertures surrounding said axis; lifting blades affixed to said drum and extending between said annular walls; a conveyor for said bottles extending and movable along a horizontal path through said apertures; stationary rails positioned aside of said path and being adjusted for guiding said bottles in erect position, said rails being interrupted by a gap; means guiding said bottles to and from a tilted position while said bottles pass said gap, said latter means comprising a stationarily adjusted finger extending from one side of the path of said bottles obliquely toward the other side; a stationarily adjusted guide plate extending along said other side in a position rising obliquely away from said conveyor, and a finger extending from said other side obliquely to the end of said gap; and a fruit supply chute extending through one of said apertures.

References Cited in the file of this patent

UNITED STATES PATENTS 2,324,823    Chilson et al. _____ July 20, 1943